June 18, 1963 G. B. COOPER 3,093,859
HOLDER FOR FISH WHILE CLEANING SAME
Filed Dec. 14, 1960 2 Sheets-Sheet 1

George B. Cooper
INVENTOR.

BY Clarence A. O'Brien
and Harvey B. Jacobson
Attorneys

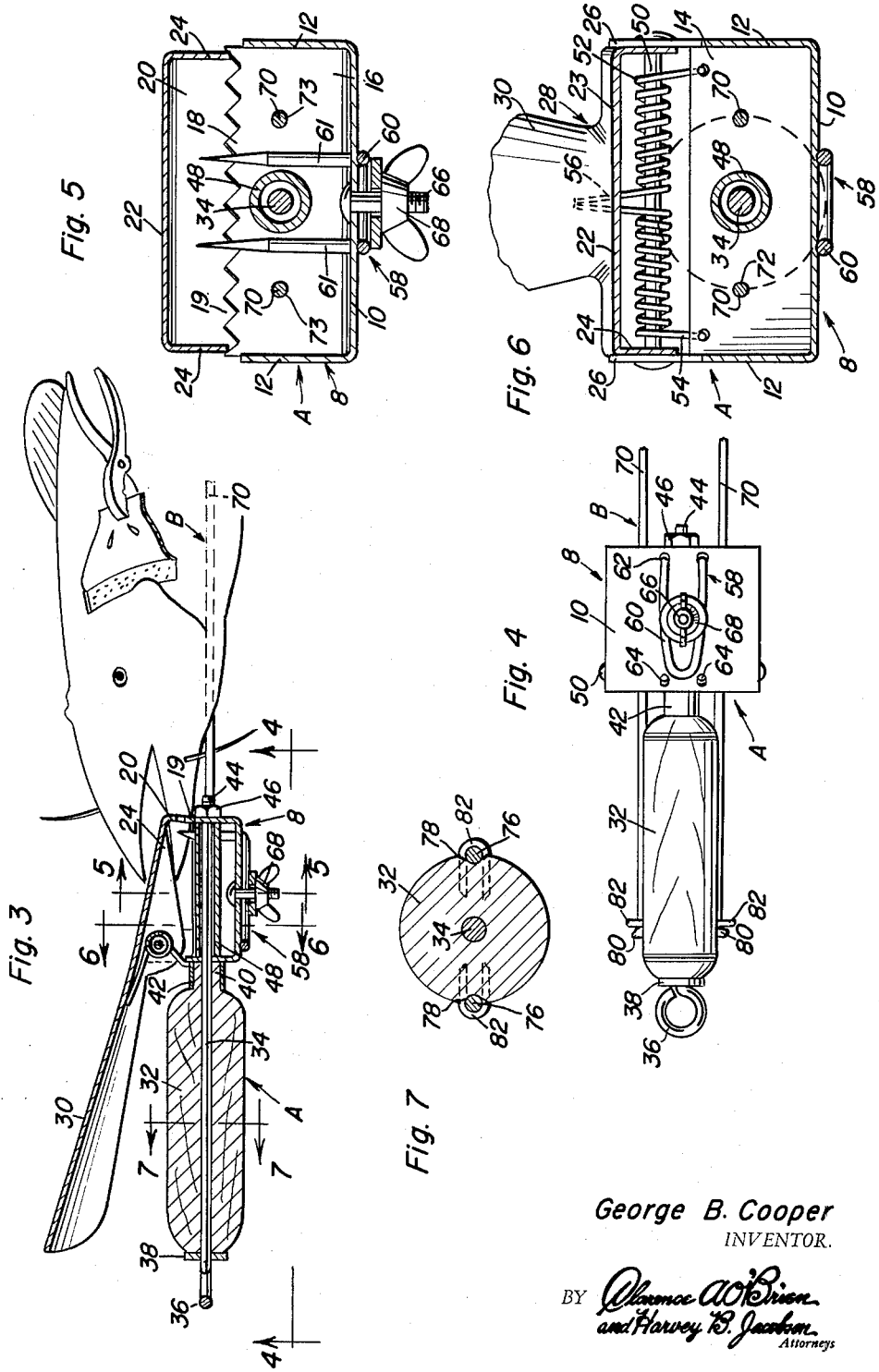

United States Patent Office 3,093,859
Patented June 18, 1963

3,093,859
HOLDER FOR FISH WHILE CLEANING SAME
George B. Cooper, Augusta, Ga.
(Rte. 3, Jefferson, Ga.)
Filed Dec. 14, 1960, Ser. No. 75,816
6 Claims. (Cl. 17—8)

The present invention relates to a simple, practical, highly efficient manually usable mechanical device having novel facilities through the medium of which a user may effectually hold a fish in order to scale it and/or skin it.

Briefly, the holder is characterized by a clamp having spring-biased jaws opposed and movable toward and from each other and handles for urging the jaws to open position and allowing same to close under action of the spring-biasing means, and fish supporting and stabilizing means embodying a frame slidingly and adjustably connected to said clamp and having a fish head embracing fish retainer manually shiftable toward and from said jaws.

Somewhat more specifically, novelty is predicated upon a clamp embodying a first unit having a jaw at one end and a hand-grip at an opposite end, a second unit spring-loaded and pivotally mounted on the first unit and having a jaw at one end opposed and movable toward and from the first mentioned jaw and also having a lever-type handle oposed to and pressable toward said hand-grip, said hand-grip having a fixed eye at the end remote from said jaws and by which it is adapted to be hung or otherwise supported while the head of a catfish, for instance, is clamped removably between the jaws, and fish body and tail bracing and supporting means slidingly mounted on said first jaw unit.

A further improvement resides in the construction above defined particularly wherein the bracing and supporting means has to do with a simple frame fashioned from a length of rod which is bendable but nevertheless rigid and which embodies spaced parallel coplanar arms slidably connected to the first unit and also the hand-grip, and a lateral C-shaped fish head embracing member shiftable toward and from the jaws and thus adjustably positionable relative to the jaws.

Persons conversant with the art to which the invention relates are aware that prior art adaptations are structurally and functionally complicated, often clumsy and difficult to handle and use and are generally too expensive. It follows that it is an objective in the instant matter to structurally, functionally and otherwise improve upon similarly constructed and performing holders and, in doing so, to provide a special adaptation of the same which is relatively simple and economical, so far as all are concerned, and which is particularly useful, in fact, ideal, in handling the skinning and cleaning job involved with a catfish.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a partial sectional view similar to FIG. 2 and showing in particular how the invention lends itself to use when handling, skinning and cleaning a catfish.

Figure 1:
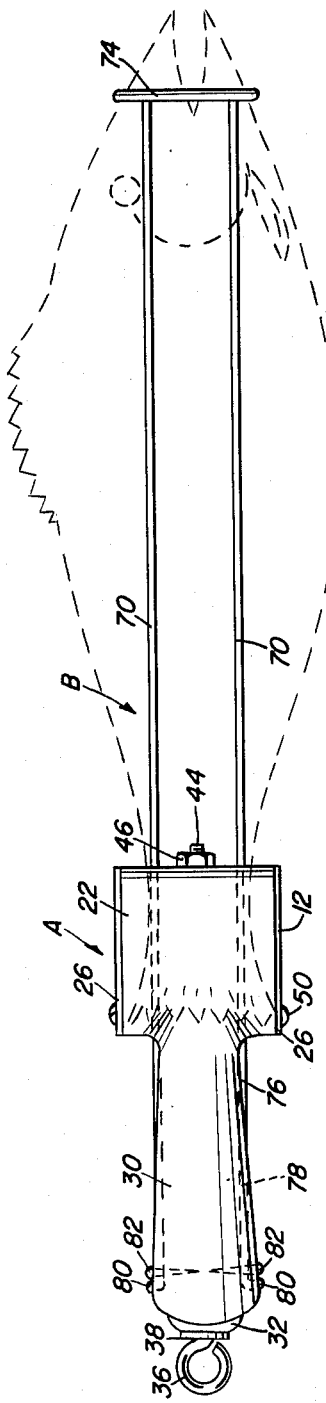
FIG. 1 is a top plan view showing a holder embodying the improvements characterizing the instant invention.

FIG. 4 is a horizontal sectional view, while FIGURES 5, 6 and 7 are views taken upon an enlarged scale on the lines 4—4, 5—5, 6—6 and 7—7, respectively, of FIG. 3.

Generally speaking, the holder is characterized by two component parts; namely, clamping means, and complemental and companion fish holding, stabilizing and supporting means. One may visualize the invention as comprising clamping means slidingly mounted on and adjustable relative to the holding and stabilizing means or conversely, the holding and stabilizing means or part as being slidingly mounted on the clamping means. In the present disclosure, the clamping means, which is adapted to be held in one hand, is being designated as the relatively stationary component part while the other means, the holder and stabilizer, is the shiftable part. The clamping means is denoted A while the companion and complemental holder and stabilizing means or part is denoted B.

The means A comprises a bottom jaw unit 8. More specifically, this comprises a substantially rectangular pan having a bottom 10 spaced parallel side walls 12, a rear wall 14 and a spaced parallel forward wall 16 (FIG. 5). The upper edge of the wall 16 is serrated to provide teeth 18 which accommodate coacting teeth 19 on a flange 20 at the forward end of the second jaw unit 22. This part 22 comprises a plate 23 having side flanges 24 with the flanges pivoted between upstanding ears 26 on the first unit 8 as shown perhaps best in FIG. 6. The rearward or left-hand end portion of the second unit 22 has an integral lever-like member which is here referred to as a handle 30. This handle is adapted to be pressed or moved toward and from a solid wooden or an equivalent hand-grip 32 which has a rod passing axially therethrough, the rod 34 having a suspension eye 36 at the left-hand end adjacent to a wear-resisting washer 38. The shank portion of the rod projects beyond the forward reduced neck 40 (FIG. 3) which is surrounded by a ferrule 42, the end of the rod being screw-threaded at 44 to accommodate a nut 46. This shank portion passes through and beyond holes provided therefor in the rear and front walls 14 and 16 of the aforementioned pan-like first jaw unit 8. The numeral 48 designates a stabilizing and rigidifying sleeve which encircles the portion of the shank within the marginal limits of the pan portion of the jaw unit 8. The pivot pin or bolt 50 passes through the ears 26 and flanges 24 to maintain the assembly seen in FIG. 6 and also to accommodate the coil springs 52 having end portions 54 anchored in holes provided therefor in the rear wall 14. The other extending end portions 56 are bent and act on the end of the lever 30 where it joins the plate-like member 23 of the second jaw unit. It follows that the jaws are spring-loaded and are normally pressed to closed position in the manner illustrated.

While considering this part A of the over-all structure attention is directed to FIG. 4 wherein it will be seen that a special staple 58 is offered for use in connection with the job of holding a catfish in the manner shown for example in FIG. 3. The cleat or staple comprises a U-shaped portion with laterally bent pointed prongs which may be fitted to extend through either the holes 62 (front holes), or the selectively usable holes 64 (the rear holes). The bolt 66 and nut assembly 68 is utilized here to hold this cleat or staple in either of its usable positions.

With further reference to the staple means 58 and before continuing with the other details, it is to be explained that the sole purpose of this simple device is to assist in holding a catfish in the manner shown in FIG. 3 as will be further described. When the staple means 58 is not in use as shown in these figures, it may be reversed and stored in an out-of-the-way position as shown in FIG. 2 whereupon the tines or prongs 61 are out-of-the-way, so to speak.

Taking up now the unit or means B, this, as before mentioned, is preferably fashioned from a single length of rod or stout wire stock. It comprises a longitudinally elongated frame. The frame, in turn, is made up of a pair of spaced parallel limbs or arms 70 which are linearly straight and coplanar and of the approximate length depicted in the views of the drawings. These arms are slidingly mounted in holes 72 provided therefor in the wall 14 and 73 in the wall 16 (FIGS. 6 and 5, respectively). The forward or right-hand end portions of the limbs are connected to and joined integrally with a right angularly disposed C-shaped yoke or an equivalent saddle 74. This part is saddled over the head of the fish or otherwise the head of the fish is jammed therein and held in the manner shown in phantom lines in FIGS. 1 and 2. The left-hand end portions 76 of the limbs are slidable in channels or grooves 78 provided in opposite sides of the hand-grip. The terminal free ends are laterally bent as at 80 to provide limit stops. Also, the diametrically opposite portions of the hand-grip have eyes 82 secured in place in line with the channels or grooves which constitute stop shoulders. These coacting stop members maintain the main component parts A and B in assembled relation and permit sliding B in relation to A to achieve the desired fish holding, clamping and stabilizing results.

Experience has shown that a satisfactory way of using the invention as a holder for a fish while cleaning the same is generally as follows. The user may take the holder in the right hand, for example. Then he should place the hand over the top with the trip lever or spring-loaded handle 30 between the thumb and first finger. He should let the fingers grip the handle and squeeze it to open the toothed gripping jaws 8 and 22. The next step is to pull the slide means B all the way out until the stops 80 engage the stop shoulders 82. Then, the fish is placed with the fish tail between the clamping jaws and the jaws are let go to obtain the grip. Next, it is advisable to place the slide bar end in the middle of the left hand, sliding up until the head of the fish enters the circular or C-shaped space defined by the aforementioned yoke or saddle 74. Then, the holder may be gripped in the left hand letting the thumb go under the lever jaw opener. By gripping it tight this will hold the slide bar and keep it from sliding forward. Then simply take a fish cleaner or scraper and clean off the scales after which remove the fish and turn it over to clean or scale the other side. The fish may also be butchered and cleaned if desired.

Figure 2:
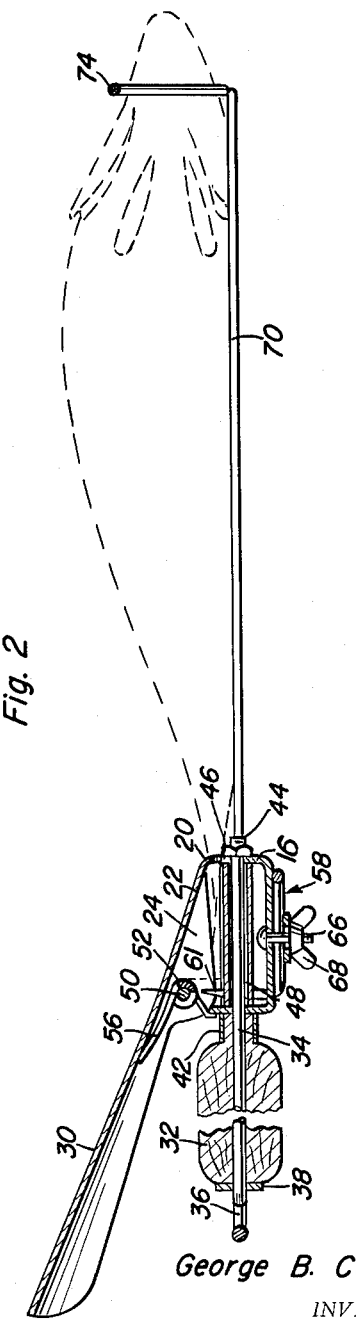
FIG. 2 is a vertical central longitudinal sectional view with parts in elevation of the construction shown in FIGURE 1 and with parts broken away.

When cleaning a catfish, the procedure is somewhat the same but first it is advisable to place the so-called fangs up through the front hole, that is, the fangs or prongs 61 on the aforementioned staple or cleat 58, see FIGURES 1 and 2. The wing nut is tightened as is obvious. By opening the jaws of the holder and placing the head of the catfish between the jaws with the top jaw of the holder in the mouth of the fish and the bottom jaw of the fish in the manner illustrated in phantom lines in FIGURES 1 and 2 it will be evident that the prongs 61 penetrate the lower jaw and hold it. With the head of the fish thus clamped in position the entire instrumentality may be hung up on a nail with the use of the aforementioned eye 36. This gives the user both hands to cut and strip off the skin of a catfish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fish dressing implement comprising a clamp and an elongated extension frame slidably mounted upon said clamp, and having a retaining means, said clamp and retainer being operable to grip opposite ends of a fish to be dressed, said clamp comprising a pair of relatively movable jaws, pivot means connecting said jaws for pivotal movement towards and from each other, resilient means engaging said jaws and yieldingly biasing them towards a gripping position, said retainer including means for embracing and holding the head of a fish when the tail thereof is gripped by said jaws, means on said clamp slidingly and guidingly engaging and retaining said frame for rectilinear sliding movement whereby to adjust said retainer relative to said jaws for securely holding the opposite ends of fish of different sizes to be cleaned, prongs carried solely by one of said jaws and having points disposed between said jaws and projecting toward the other jaw for piercing and securing to said clamp a portion of a fish disposed between said jaws.

2. The combination of claim 1 wherein said frame consists solely of a pair of parallel rod-like side members and said retainer member comprises a rod-like open frame constituting an integral portion of said side members.

3. The combination of claim 1 wherein one of said jaws includes sets of apertures therein, said prongs being selectively disposable through said sets of apertures, means for removably securing said prongs to said one jaw.

4. The combination of claim 3 wherein said jaws include cooperating teeth at the ends of the jaws adjacent said retainer, said sets of apertures being located at longitudinally spaced distances from said teeth and each other whereby said teeth may be selectively rendered operative and inoperative.

5. The combination of claim 1 wherein said prongs consisting of a single rod-like element having parallel sides integrally joined at one end and having the other end of each side terminating in said points, said element having its pointed ends angulated with respect to its joined end.

6. The combination of claim 5 including means for securing said prongs to said one jaw and wherein said securing means extends between the joined end portions of said sides and secures the latter to said one jaw.

References Cited in the file of this patent

UNITED STATES PATENTS

| | | |
|---|---|---|
| 1,438,091 | Bowe | Dec. 5, 1922 |
| 2,680,877 | Thornton | June 15, 1954 |
| 2,891,275 | Schuls | June 23, 1959 |